United States Patent [19]

Schlager et al.

[11] Patent Number: 5,550,446
[45] Date of Patent: Aug. 27, 1996

[54] DUAL SLEW RATE CIRCUIT FOR DRIVER TRANSISTORS IN DISK DRIVES

[75] Inventors: Karl M. Schlager, Campbell; Li-Hsin D. Lu, San Jose, both of Calif.

[73] Assignee: SGS-Thomson Microelectronics, Inc., Carrollton, Tex.

[21] Appl. No.: 316,891

[22] Filed: Sep. 30, 1994

[51] Int. Cl.⁶ .................................................. H02P 7/00
[52] U.S. Cl. .......................... 318/439; 318/254; 318/138
[58] Field of Search ................................. 318/254, 138, 318/436, 632, 610, 616; 364/161, 162, 160, 166; 388/815, 809, 806; 360/73.01, 73.03, 73.06, 73.07, 73.04

[56] References Cited

U.S. PATENT DOCUMENTS

| | | | |
|---|---|---|---|
| 4,743,815 | 5/1988 | Gee et al. | 318/254 |
| 4,872,104 | 10/1989 | Holsinger | 318/616 X |
| 5,166,544 | 11/1992 | Carobolante | 307/270 |
| 5,172,036 | 12/1992 | Cameron | 318/138 |
| 5,191,269 | 3/1993 | Carobolante | 318/254 |
| 5,204,594 | 4/1993 | Carobolante | 318/254 |
| 5,210,474 | 5/1993 | Oswald | 318/254 |
| 5,221,881 | 6/1993 | Cameron | 318/254 |
| 5,309,078 | 5/1994 | Cameron | 318/811 |
| 5,397,967 | 3/1995 | Carobolante et al. | 318/254 |
| 5,451,832 | 9/1995 | Cameron et al. | 318/254 X |

*Primary Examiner*—Jonathan Wysocki
*Attorney, Agent, or Firm*—Joseph C. Arrambide; Lisa K. Jorgenson

[57] ABSTRACT

A method and circuit for providing a dual slew rate to a driver transistor. The method includes turning off a driver transistor at a programmable slew rate until a BEMF voltage spike is sensed, and then switching in a slower clamping slew rate. The slew rates are controlled by discharging a capacitor through a programmable discharge path until a voltage spike is detected and then through a clamping discharge path. The discharge paths include several transistors connected in series and control by digital logic.

10 Claims, 3 Drawing Sheets

DUAL SLEW RATE CIRCUIT FOR DRIVER TRANSISTORS IN DISK DRIVES

BACKGROUND OF THE INVENTION

1. Field of the Invention

This invention relates to electronic circuits for controlling the power to brushless direct current motors, and more particularly to actively controlling the slew rate of the power transistors which supply the current to the stator windings of a brushless direct current motor when the stator coils are commutated.

2. Description of the Relevant Art

The present invention pertains to polyphase direct current (dc) motors, in general, and particularly to three phase dc motors which may be of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

FIG. 1 illustrates the typical architecture of a brushless polyphase direct current motor as described in detail in U.S. Pat. Nos. 5,172,036 and 5,204,594 which are fully incorporated into this specification by reference. Specifically, FIG. 1 shows that the motor 12 consists of a stator 16 and a rotor 14. The appropriate phase of the motor is determined by Hall effect sensors 103 or by monitoring the back electromotive force (BEMF) on the floating coil. Thus, the commutator circuit 20 determines the appropriate driver circuit 10 to enable.

FIG. 2 shows a general typical schematic of the output stage of driver circuit 22 of FIG. 1. The method and apparatus for operating a polyphase motor direct current motor is more fully explained in U.S. Pat. No. 5,221,881 and is fully incorporated into this specification by reference.

Motors of this type can typically be thought of as having a stator with three coils connected in a "Y" (wye) configuration, although actually, a larger number of stator coils are usually employed with multiple motor poles. FIG. 1 shows a stator in a wye configuration as element 16. Typically, in such applications, eight pole motors are used having twelve stator windings and four N-S magnetic sets on the rotor resulting in four electrical cycles per revolution of the rotor. In bipolar operation, the coils are energized in a sequences such that a current path is established through two coils of the wye with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. Therefore, six commutation sequences are defined for each electrical cycle in a three phase motor as given below in Table A.

TABLE A

| PHASE | CURRENT FLOWS FROM: | TO: | FLOATING COIL: |
|---|---|---|---|
| 1 | A | B | C |
| 2 | A | C | B |
| 3 | B | C | A |
| 4 | B | A | C |
| 5 | C | A | B |
| 6 | C | B | A |

Another common mode of operation is the unipolar mode where one stator coil winding is energized at a time. This is accomplished by either grounding the center tap of the stator windings while sequentially energizing each stator winding, or by tying the center tap to the voltage supply and sequentially grounding the other end of each stator winding. In unipolar operation, it may be desirable to allow the voltage on the high side drivers to go several volts above Vcc to detect zero crossings, or determine rotor position, or the like.

In the either unipolar or bipolar operation of the motor, large voltage spikes are generated when the phases are commutated since the operation requires that the motor current be redirected from one stator winding to another. For example, referring now to FIG. 2, in phase 1 of Table A above, transistor 44 and transistor 45' of FIG. 2 are on which allows current to flow from the voltage source through transistor 44, stator winding A, stator winding B, and transistor 45'. During commutation from phase 1 to phase 2, transistor 45' is turned off while transistor 45" is turned on. This causes a voltage spike in the stator winding B due to the collapsing electromagnetic field which was created by the current flowing in stator winding B. The voltage spike on the stator winding is a function of the rate (di/dt) at which the stator winding current is turned off and can be described as $dV = -L(di/dt)$ where dV is the differential voltage, L is the inductance of the stator winding, and (di/dt) is the rate at which current is changing as a function of time. Therefore, the quicker the current is turned off and the larger the inductance of the stator coil, the larger the voltage spike.

In the past, this voltage spike was clamped using a diode such as the diodes 47, 47', 47" and 48, 48', 48" in FIG. 2. To illustrate how the diodes work in the circuit, assume again that the circuit is in phase 1 and will commutate to phase 2 of Table A. While in phase 1, current flows through transistor 44, stator winding A, stator coil B, transistor 45', and through sense resistor 49 to ground. Commutation occurs by turning 45' off while turning 45" on, the result of which is to redirect the current from stator winding B to stator winding C. Since the current in stator winding B has gone from some significant value to zero in a relatively short amount of time, an inductive voltage spike is generated. Therefore, the voltage potential at node "out b" is driven above the source voltage by the voltage spike. As the voltage potential at node "out b" rises above the turn-on threshold of the diode, diode 47' turns on and clamps the voltage spike to the voltage source. The turn-on voltage of a diodes is typically around 700 millivolts. Diodes 47 and 47" serve the same functions for stator windings A and C, respectively. Similarly, diodes 48, 48', and 48" clamp the voltage spikes which are created when stator windings A, B, and C are turned off after being turned on by transistors 44, 44', and 44", respectively.

These clamping diodes 47, 47', 47", 48, 48' and 48" have typically been either external or internal diodes. However, the diodes can be replaced by using a synchronous clamping technique as described in copending U.S. patent application Ser. No. 8/250,027 filed on May 27, 1994 which is wholly incorporated into this specification by reference. The aforementioned patent application teaches the technique of turning on the appropriate stator winding driver transistor when a voltage spike due to commutation is sensed.

The problem addressed by this invention occurs when stator winding driver transistors are used to clamp the recirculation voltage spike. It is well know in the art that the recirculation voltage spike due to commutation is a function of the slew rate of the driver transistors. It is also known in the art that the slew rate of the driver transistors are programmable to allow system integrators the capability to minimize EMI noise and system noise. In this environment, it has been observed that it is possible for system integrators to program slew rates which are so fast that the voltage spike could damage the integrated circuit before the clamp has time to turn on.

Therefore, it is an object of the invention to allow for fast slew rates without subjecting the integrated circuit to excessively high voltages.

It is further an object of this invention to provide reliable synchronous clamping without limiting the slew rate during commutation.

It is further an object of the invention to provide a programmable slew rate for commutation and a fixed slew rate for clamping.

SUMMARY OF THE INVENTION

The invention is a circuit and method for providing a programmable slew rate and a second slew rate. It is common in the industry to provide for a programmable slew rate which can be set by system integrator. The problem with a programmable slew rate is that a system integrator can program a slew rate so fast that the resulting BEMF voltage spike will reach a dangerously high level before a synchronous clamp can clamp the voltage spike. The invention solves this problem, switching in a slower slew rate when a voltage spike is sensed.

DETAILED DESCRIPTION OF THE PREFERRED EMBODIMENT

A dual slew rate circuit for controlling the slew rate of a driver transistor in a disk drive constructed according to a the preferred embodiment of the invention will be described.

Figure 1:
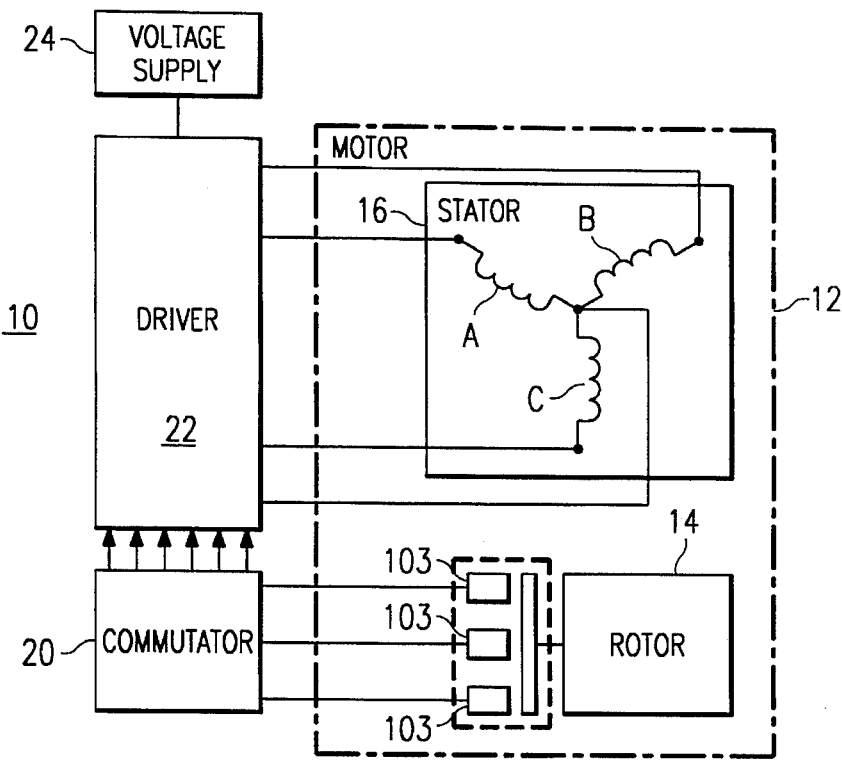
FIG. 1 is a block diagram of a motor control circuit.
Figure 2:
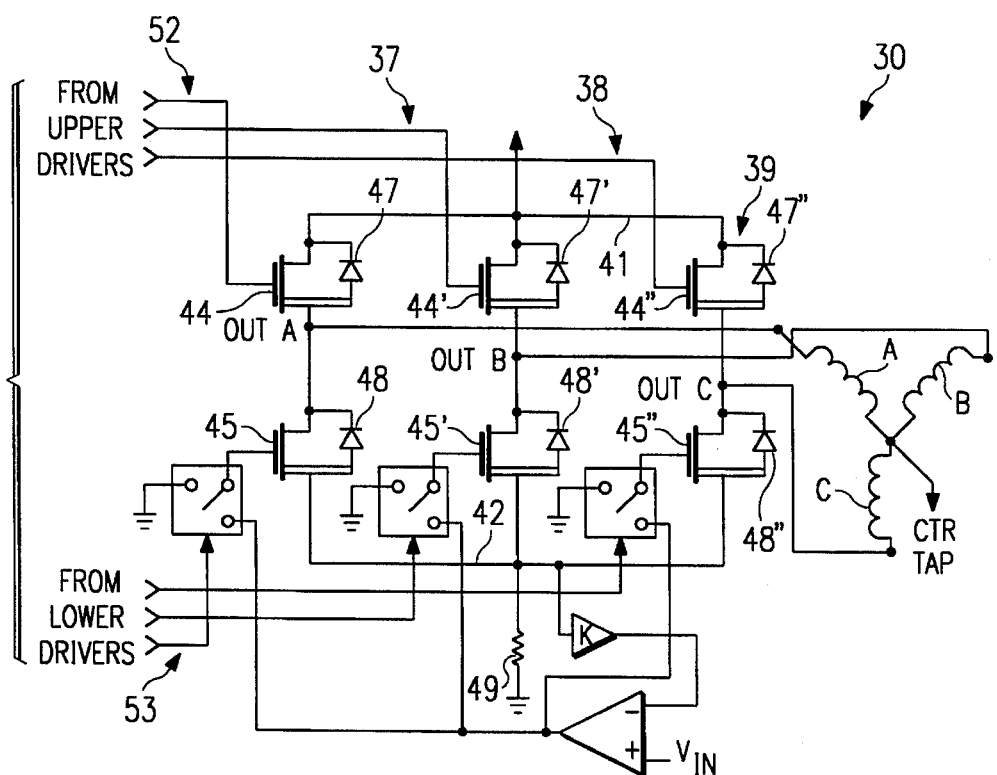
FIG. 2 is a schematic diagram of a motor control circuit.

The invention is a circuit which is part of the driver circuit 22 in FIG. 1. The output of the circuit is the low side input labeled "FROM LOWER DRIVERS" in FIG. 2.

Figure 3:
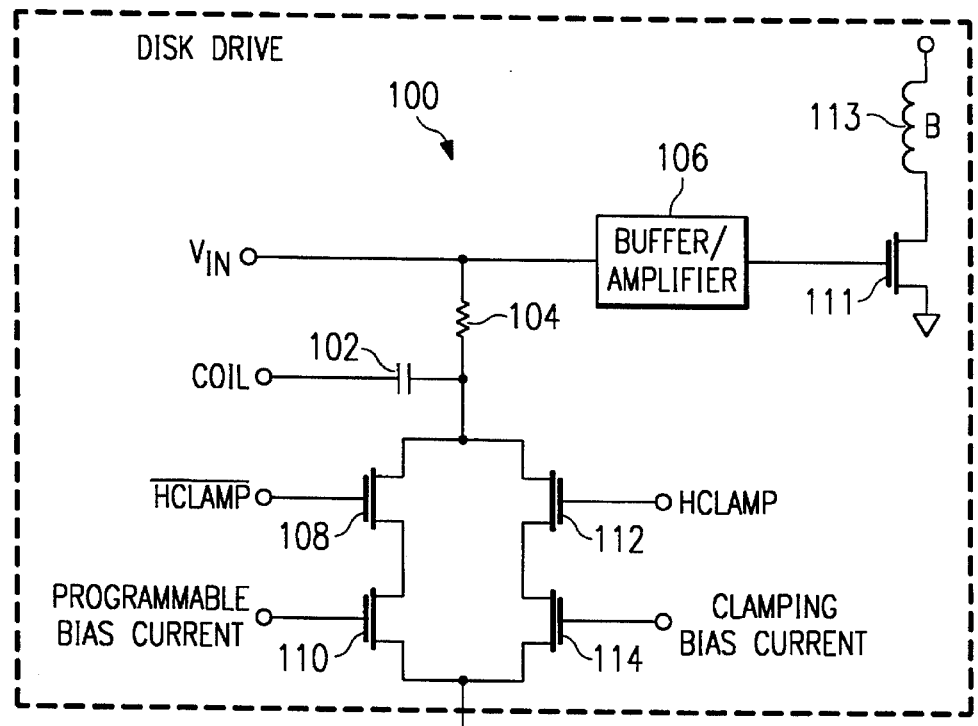
FIG. 3 is a schematic diagram of a low side dual slew rate circuit.

Referring now to FIG. 3, the construction of a low side dual slew rate circuit 100 for a disk drive will be described. The first end of resistor 104 is connected to an input of buffer amplifier 106 and the Vin node. The output of the buffer amplifier 106 provides the drive current to the low side driver gate. The first plate of capacitor 102 is connected a coil on the non-centertap side. The second plate of capacitor 102 is connected to a second end of resistor 104, to the drain of n-channel transistor 108, and the drain of n-channel transistor 112. The gate of transistor 108 is connected to a inverted h-clamp node. The source of transistor 108 is connected to the drain of n-channel transistor 110. The gate of transistor 110 is connected to a programmable bias current node. The source of transistor 110 is connected to a voltage reference, ground. The gate of transistor 112 is connected to an h-clamp signal node and the source of transistor 112 is connected to the drain of n-channel transistor 114. The gate of transistor 114 is connected to a bias current node and the source of transistor 114 is connected to ground.

In operation, the low side driver transistor is controlled by the Vin signal when the driver transistor is driving current through a stator winding (as is known in the art) and is controlled by low-side dual slew rate circuit 100 when the low side driver is switched off. More specifically, the Vin signal drives the buffer amp 106 which drives the low side driver gate such that current is driven through a stator coil, as is known in the art. During commutation, the Vin signal is switched off so that the current in the coil is reduced to zero. Consequently, the coil develops a BEMF voltage which charges capacitor 102 and is sensed by buffer amplifier 106 through resistor 104. Consequently, the slew rate of the low side driver transistor is increased because of the feedback loop through the coil, capacitor 102, and resistor 104.

The slew rate is further controlled by controlling the discharge of capacitor 102. Transistors 108 and 110 provide the discharge path for a programmable slew rate and transistors 112 and 114 provide the discharge path for a clamping slew rate. The programmable bias signal provides a bias current which has been selected by the system integrator. The clamping bias current provides a bias current which yields a slew rate which is slow enough for a synchronous clamp to operate reliably. During commutation the h-clamp signal is low and inverted h-clamp signal is high. Therefore, slew rate is controlled by the programmed bias current. When the BEMF triggers the high side synchronous clamp circuit, the h-clamp signal goes high turning off transistor 108 and turning on transistor 112. Consequently, the slew rate is changed to a level proportional to the clamping bias current. In the preferred embodiment, resistor 104 is 10 Kohms, capacitor 102 is a 20 pFs, and the clamping bias current is set so that 5 microamps flows through transistors 112 and 114. The programmable bias current is nominally set to provide 20 microamps, but can be programmed by a system integrator to provide more or less than the nominal current.

Figure 4:
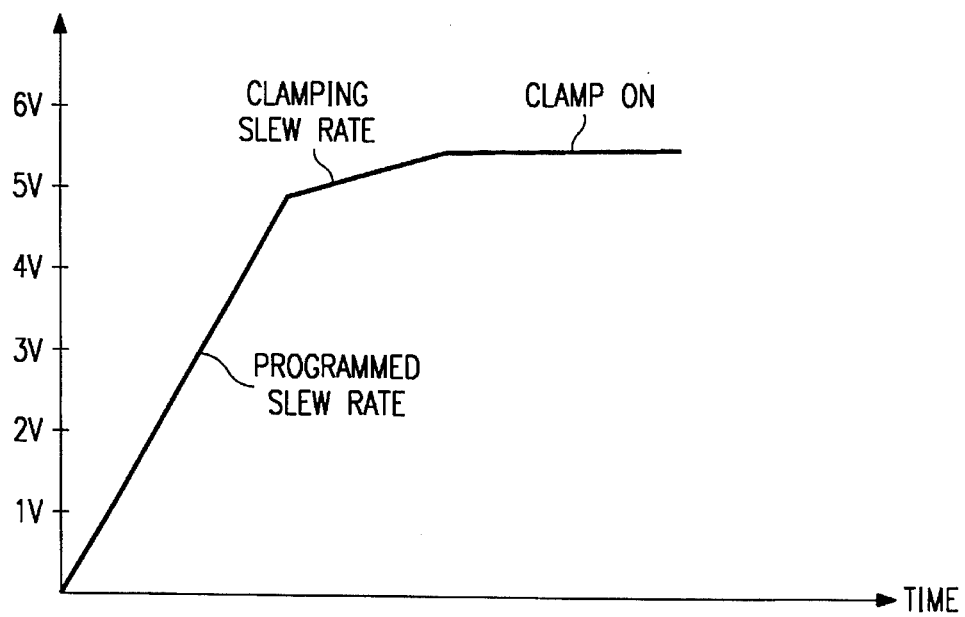
FIG. 4 is a graph illustrating the performance of a low side dual slew rate circuit.

FIG. 4 illustrates the voltage on the coil beginning when the Vin voltage is switched off. The first line segment shows a programmable slew rate which is relatively fast. The second line segment shows a significantly slower slew rate. This slower slew rate insures that the synchronous clamping transistors will turn on before the BEMF voltage exceeds a level which can damage the integrated circuit.

Figure 5:
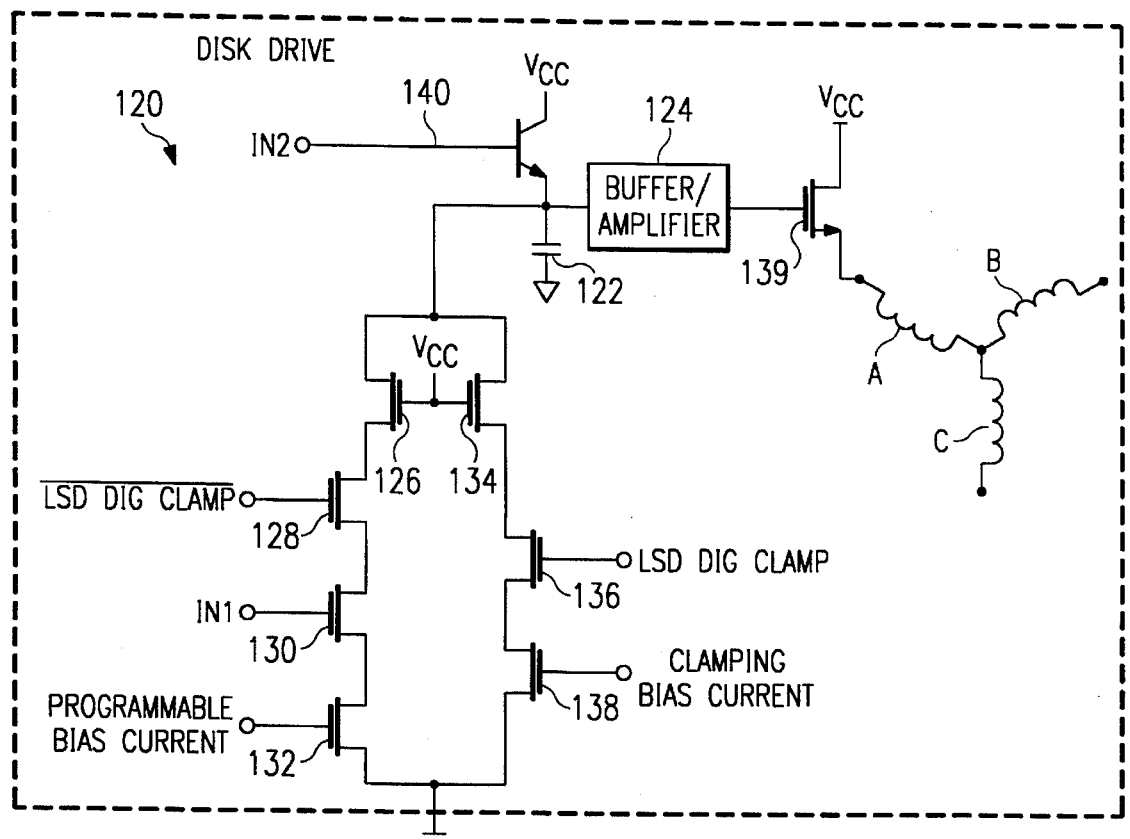
FIG. 5 is a schematic diagram of a high side dual slew rate circuit.

Referring now to FIG. 5, the construction of a high side dual slew rate circuit 120 for a disk drive will be described. The invention is a circuit which is part of the driver circuit 22 in FIG. 1. The output of the circuit is the low side input labeled "FROM UPPER DRIVERS" in FIG. 2. The first plate of capacitor 122 is connected to the emitter of a NPN transistor 140, to the input of the buffer amplifier 124, and to the drains of n-channel transistors 126 and 134. The output of the buffer amplifier 124 is connected to the high side driver gate. The second plate of the capacitor 122 is connected to ground. The gates of transistors 126 and 134 are connected to a Vcc voltage. The source of transistor 126 is connected to the drain of n-channel transistor 128. The gate of transistor 128 is connected to an inverted LSD-DIGCLAMP node. The LSDDIGCLAMP signal is a digital signal which goes high when a low side voltage spike is detected. The source of transistor 128 is connected to the drain of n-channel transistor 130. The gate of transistor 130 is connected to In1 signal. The source of transistor 130 is connected to the drain of n-channel transistor 132. The gate of transistor 132 is connected to a programmable bias current node. The source of transistor 132 is connected to ground. The source of transistor 134 is connected to the drain of n-channel transistor 136. The gate to transistor 136 is connected to a LSDDIGCLAMP node. The source of transistor 136 is connected to the drain of n-channel transistor 138. The gate of transistor 138 is connected to a clamping bias current node. The source of transistor 138 is connected to ground. NPN transistor 140 has a collector connected to Vcc and an emitter connected to the first plate of capacitor 122. The base of transistor 140 is connected to a digital input signal In2.

Figure 6:
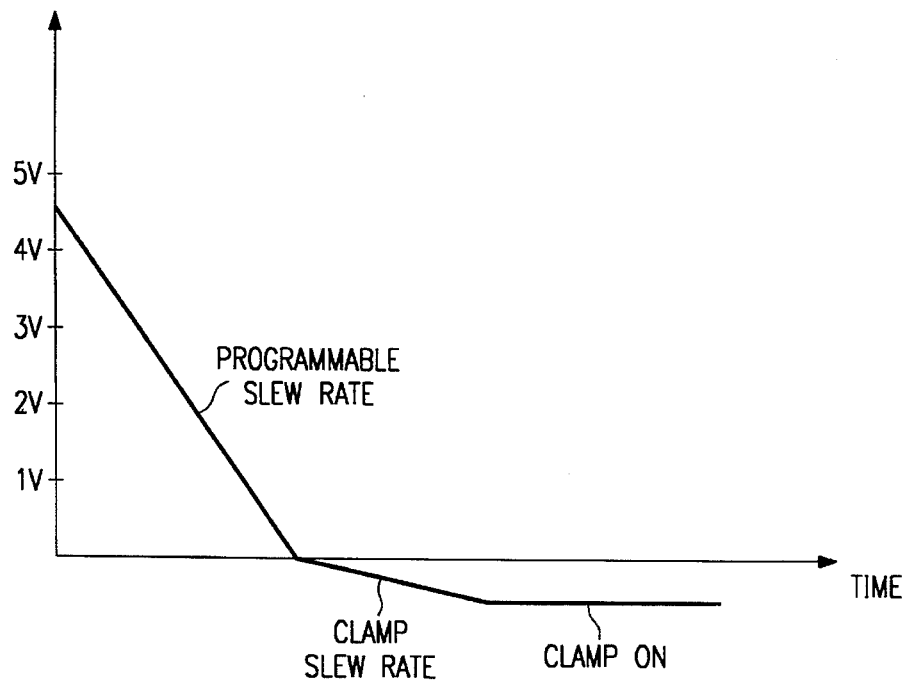
FIG. 6 is a graph illustrating the performance of a high side dual slew rate circuit.

In operation, capacitor 122 is charged by transistor 140 when digital signal In2 is high. Transistors 126, 128, 130, and 132 provide the current path for discharging capacitor 122 at the programmable slew rate. Transistors 134, 136, and 138 provide the current path for discharging capacitor 122 at the clamping slew rate. The slew circuit is disabled until the particular high side driver switches from on to off. At that time, digital signal In2 turns transistor 140 off, digital signal In1 turns transistor 130 on, and the inverted LSDDIGCLAMP signal has transistor 128 turned on. Therefore, the programmable bias current controls the current through transistor 132 and therefore controls the rate at which capacitor 122 is discharged, which ultimately controls the slew rate of the high side driver. When the voltage on the coil drops below ground, LSDDIGCLAMP signal switches from low to high and inverted LSDDIGCLAMP signal switches from high to low. The capacitor 122 is discharged through transistors 134, 136, and 136 at a rate controlled by the clamping bias current. The programmable slew rate and clamping slew rate are illustrated in FIG. 6. The first line segment shows a fast slew rate which is programmable. The second line segment shows a significantly slower slew rate. This slower slew rate insures that the synchronous clamping transistors will turn on before the BEMF voltage exceeds a level which can damage the integrated circuit.

The dual slew rate circuit offers the advantages of allowing for fast slew rates without subjecting the integrated circuit to excessively high voltages. Additionally, this invention provides reliable synchronous clamping without limiting the slew rate during commutation and provides a programmable slew rate for commutation and a fixed slew rate for clamping.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A circuit for driving a winding of a direct current motor comprising:

a transistor having a current path connected between a drive voltage and said winding, for selectively conducting current through the winding, and having a control terminal;

a buffer amplifier having an input for receiving a commutation signal and having an output connected to the control terminal of said transistor; and a dual slew rate control circuit having an output connected to the input of said buffer amplifier for controlling the slew rate of said transistor, wherein said dual rate control circuit has a first slew rate and a second slew rate, and has an input for receiving a digital clamp signal for switching between the first and the second slew rates responsive to the digital clamp signal.

2. The circuit of claim 1 wherein said first slew rate is user definable.

3. The circuit of claim 1 wherein said first slew rate controls the transistor slew rate during the commutations of said windings.

4. The circuit of claim 1 wherein said second slew rate is a fixed slew rate.

5. The circuit of claim 4 wherein said second slew rate controls said transistor during the clamping of a voltage spike, responsive to the digital clamp signal.

6. A circuit for driving a winding of a direct current motor comprising:

a transistor having a current path connected between a drive voltage and said winding, for selectively conducting current through the winding, and having a control terminal;

a buffer amplifier having an input for receiving a commutation signal and having an output connected to the control terminal of said transistor; and a dual slew rate control circuit having an output connected to the input of said buffer amplifier for controlling the slew rate of said transistor; wherein said dual rate control circuit comprises:

a capacitor having a first plate connected to the input of the buffer amplifier, a first transistor having a control element connected to a inverted digital clamp signal, having a first end of a current path connected to the second plate of said capacitor, and having a second end of the current path;

a second transistor having a control element connected to a programmable bias current and having a current path connected between a voltage reference and the second end of the current path of said first transistor;

a third transistor having a control element connected to the digital clamp signal and having a first end of a current path connected to the second plate of said capacitor and having a second end of the current path; and a fourth transistor having a control element connected to a fixed current bias signal and having a current path connected between the second end of the current path of said third transistor and the voltage reference, said first and second transistors providing a discharge path for said capacitor if the digital clamp signal is low and said third and fourth transistor providing a discharge path for said capacitor when said digital clamp signal is high.

7. The circuit of claim 6 wherein said capacitor is a miller capacitor.

8. A circuit for driving a winding of a direct current motor comprising:

a transistor having a current path connected between a drive voltage and said winding, for selectively conducting current through the winding, and having a control terminal;

a buffer amplifier having an input for receiving a commutation signal and having an output connected to the control terminal of said transistor; and a dual slew rate control circuit having an output connected to the input of said buffer amplifier for controlling the slew rate of said transistor, wherein said dual rate control circuit comprises:

a capacitor having a first plate connected to the input of the buffer amplifier, a first transistor having a control element connected to a inverted digital clamp signal, having a first end of a current path connected to the second plate of said capacitor, and having a second end of the current path;

a second transistor having a control element connected to a programmable bias current and having a current path connected between a voltage reference and the second end of the current path of said first transistor;

a third transistor having a control element connected to the digital clamp signal and having a first end of a current path connected to the second plate of said capacitor and having a second end of the current path; and a fourth transistor having a control element connected to a fixed current bias signal and having a current path connected between the second end of the current path of said third transistor and the voltage reference, said first and second transistors providing a discharge path for said capacitor if the digital clamp signal is low and said third and fourth transistor providing a discharge path for said capacitor when said digital clamp signal is high.

9. The circuit of claim 8 wherein said capacitor is a miller capacitance of a transistor.

10. A method of commutating stator coil windings in a disk drive comprising the steps of:

driving a stator coil winding with a transistor;

turning off said transistor at a first slew rate;

sensing for voltage spikes on said stator coil; and turning off said transistor at a second slew rate responsive to sensing a voltage spike on said stator coil.

* * * * *